(No Model.)  
2 Sheets—Sheet 2.
G. L. O. DAVIDSON.
VELOCIPEDE.
No. 295,364.  
Patented Mar. 18, 1884.
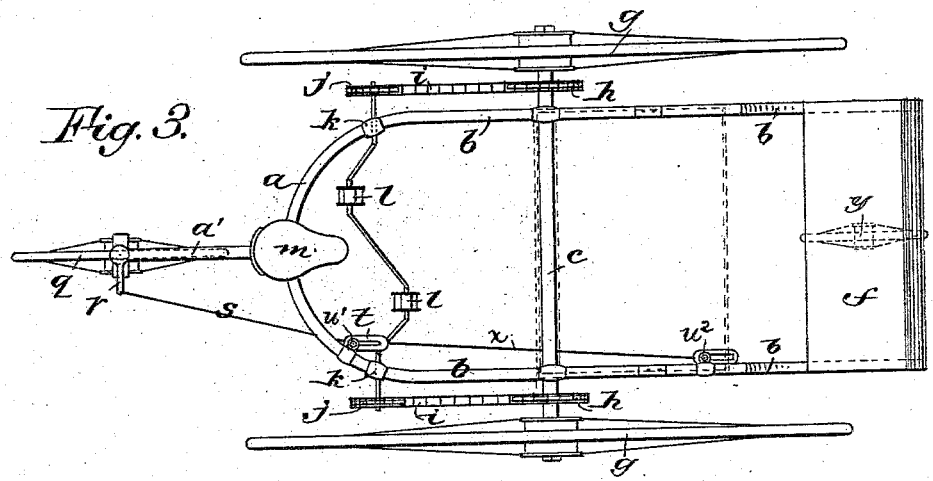
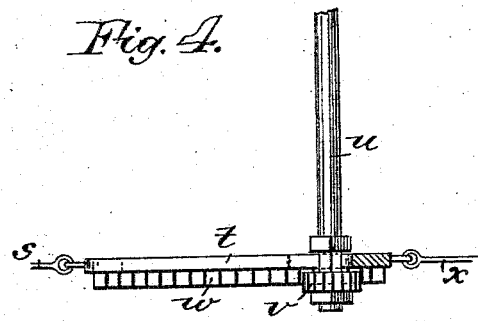
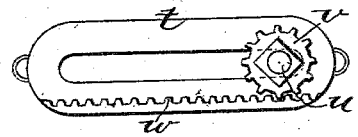
WITNESSES:
INVENTOR:  
G. L. O. Davidson  
BY  
ATTORNEYS.

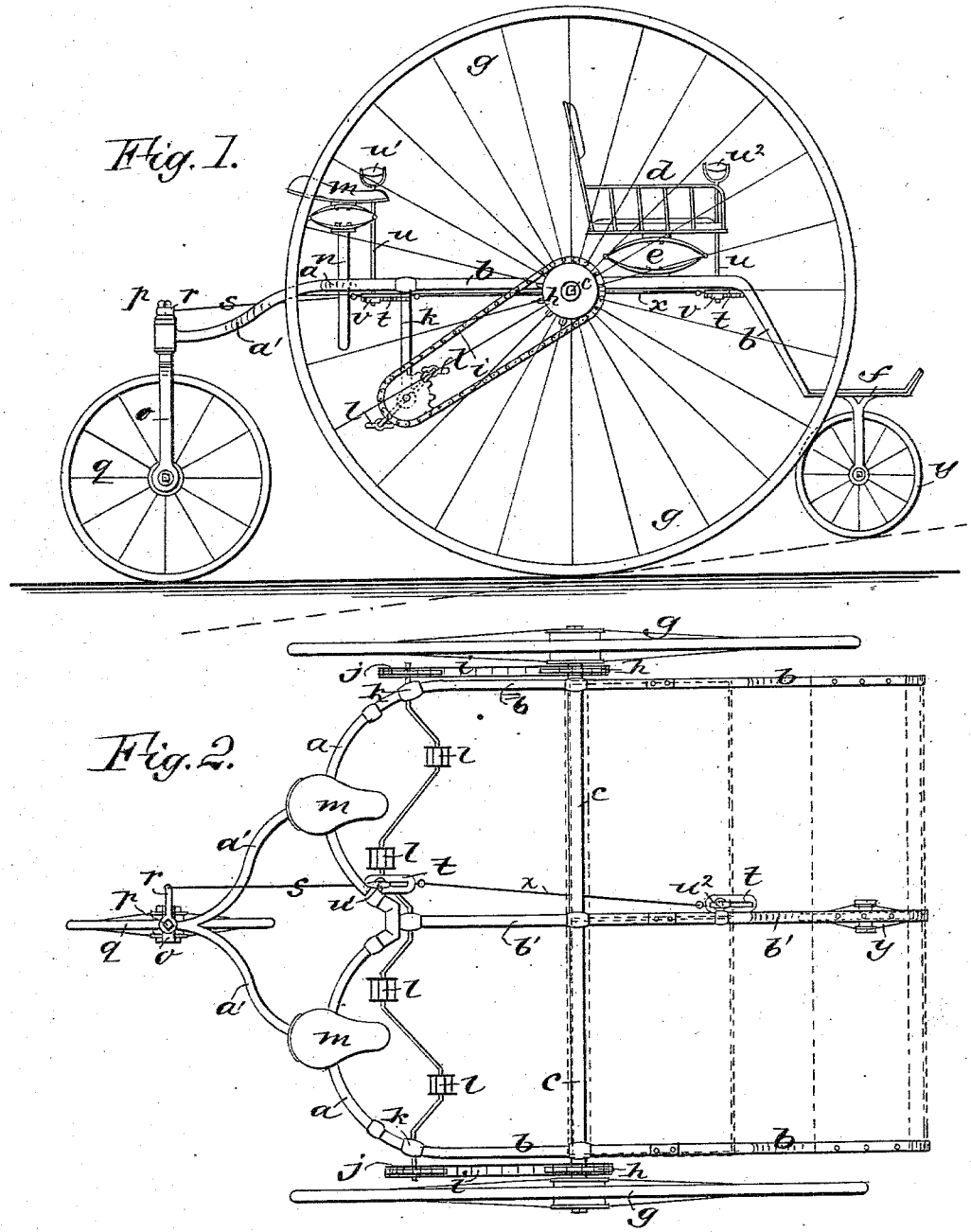

UNITED STATES PATENT OFFICE.

GEORGE LOUIS OUTRAM DAVIDSON, OF MANCHESTER, COUNTY OF LANCASTER, ENGLAND.

VELOCIPEDE.

SPECIFICATION forming part of Letters Patent No. 295,364, dated March 18, 1884.

Application filed January 2, 1884. (No model.) Patented in England July 9, 1881, No. 3,016.

*To all whom it may concern:*

Be it known that I, GEORGE LOUIS OUTRAM DAVIDSON, of Manchester, in the county of Lancaster, England, have invented certain new and useful Improvements in Velocipedes, of which the following is a full, clear, and exact description.

The object of my invention is to provide a lightly-constructed, substantial, and inexpensive velocipede for speedy travel over ordinary roads.

The invention consists in improvements in the mounting of the frame and wheels of a velocipede having opposite main wheels and steering and leading wheels, and with relation to the rear driver's seat and front passenger's seat, to cause the weight of the mounted driver to overbalance the weight of the passenger, to hold the steering-wheel to the ground, except when the driver dismounts to push the machine forward by hand.

The invention consists, also, in special constructions of the frame of the velocipede and of the steering-gear, and of particular constructions and combinations of the parts for effectively guiding the velocipede either by the mounted driver or passenger, all as hereinafter fully described and claimed.

Reference is to be had to the accompanying drawings, forming part of this specification, in which similar letters of reference indicate corresponding parts in all the figures.

Figure 1 is a side elevation of my improved velocipede as arranged for two workers or drivers and two passengers. Fig. 2 is a plan view of the same. Fig. 3 represents in plan view the velocipede as constructed for one driver and one passenger. Fig. 4 is a sectional side elevation of the steering-wheel-operating gear, and Fig. 5 is an under side view of the same.

I make the frame of the velocipede of hollow light steel bars or tubes, bent in U form, for a one-passenger vehicle, as in Fig. 3, with a bowed hind cross head or bar, $a$, and two side arms or bars, $b\,b$, extended forward to rest on and be fixed to the axle $c$, and reaching beyond the axle, so as to support the seat $d$, the springs $e$ of which connect in any approved way with the side bars, $b\,b$, and beyond the seat these side bars are bent downward and forward, and it may be upward, to support the foot-board or stretcher $f$, which is fixed to the side bars, $b$, and stays the bars laterally and strongly at the front.

On the axle $c$, I mount, rigidly, a couple of main road-wheels, $g$, to the hubs of which or to axle $c$ are attached chain-wheels $h$, over which chains $i$ pass to rear chain-wheels, $j$, journaled suitably in pendent bars or arms $k$, fixed to the main-frame bars, as shown. The shafts of wheels $j$ are journaled in the frame, and are suitably cranked and fitted with foot-treadles $l$, to be worked by a worker or driver sitting on any approved spring or other seat, $m$, which preferably is fixed to a standard, $n$, held adjustably in bearings of the frame, to be raised or lowered at will to suit drivers of different statures, so that all may reach the treadles to work them with the best effect.

By a suitable extension, $a'$, of the frame at the rear, and in a fork, $o$, thereof journaled to swing horizontally on a vertical axis or pivot-shaft, $p$, I mount the steering-wheel $q$, the shaft $p$ having a rigid arm, $r$, connecting by a rod, $s$, with a yoke-piece or plate, $t$, which is fixed to the frame, and slotted centrally for the passage through the slot of the vertically-arranged shaft $u$, which carries fixedly the pinion $v$, which meshes with a rack, $w$, formed on or attached to one side of the yoke $t$, so that by turning the shaft $u$ by its handle $u'$, convenient to the driver's seat, the arm $r$ and wheel $q$ may be turned more or less in either direction to guide the velocipede by the driver, as desired; and to provide for steering the vehicle by the passenger or passengers sitting on the forward seat, $d$, which is fixed by bolted springs to the side bars, $b$, of the frame, I carry forward from the rear yoke and rack, $t\,w$, a rod, $x$, which is connected with a duplicate yoke, $t$, and parts $u\,v\,w$, located to bring the handle $u^2$ conveniently in position to be worked by the passengers at pleasure from the seat $d$.

Beneath the foot-board or stretcher $f$, I journal in suitable forked arms the leading-wheel $y$, which normally is free from the ground about two or three inches when the velocipede is driven by one or more drivers on the saddle-seats $m$, and with the passengers in the forward seats, $d$, said seats $m\,d$ being located back and forward of the axle c relatively with each other and the axle, to cause the weight of the driver to overbalance that of the passenger and hold the steering-wheel q to the ground; but in ascending steep grades the driver dismounts from the seat m, and the passenger's weight on the seat d carries the leading-wheel y to the ground and lifts the steering-wheel q, whereupon the driver pushes the velocipede up the grade from behind, as he would an ordinary perambulator, and upon reaching level ground or a downgrade the driver will again mount seat m, which will lower wheel q and lift the passenger and leading-wheel y, as in full lines, Fig. 1, and drive the velocipede forward by the treadles l, as before; and in practice the treadle-gearing will be arranged to have the treadles ungear and remain at rest while on a downgrade for the relief of the driver, who will thus be at liberty to give his whole attention to applying the brakes for controlling the descent of the machine.

The brakes may be of any approved kind for effective action, and are not shown in the drawings.

The velocipede may be built either for a single passenger and driver, as in Fig. 3, or two passengers and two drivers, as in Figs. 1 and 2. In the latter case the frame has two bowed cross heads or bars, $a\ a$, two side bars, $b\ b$, and a central bar, $b'$, all three bars being connected and braced by the forward seat, d, and the foot-board or stretcher f; and the velocipede may be built by side extensions of the frame and duplications of the driving-gearing, to accommodate three or more passengers and drivers, if desired.

Any suitable awning or sunshade may be provided by fixtures attached to the frame, and the machine, being intended to carry considerable weight, will have heavier wheel-tires than ordinary machines of this class.

The entire machine, while being light in appearance and construction, is very strong and substantial, and is well calculated for prolonged use in any climate, and may be run at a high rate of speed.

Having thus described my invention, I claim as new and desire to secure by Letters Patent—

1. A velocipede constructed with a suitable frame, main wheels g, steering-wheel q, leading-wheel y, and a forward passenger-seat, d, and rear driver's seat, m, said seats m d being relatively positioned with each other and the main wheels and axle to cause the driver's weight to overbalance that of the passenger, to hold the steering-wheel to the ground and the leading-wheel therefrom, and to permit the passenger's weight to carry the leading-wheel to the ground when the driver dismounts, substantially as shown and described.

2. The velocipede-frame constructed of hollow bars bent to form a head, a, having extension $a'$ for support of the steering-wheel, and side-bar extensions $b\ b$, which connect to the axle, support the seats, and are bent downward and forward at the front, where they have the connected bracing foot-board or stretcher f, for support of the leading-wheel, substantially as shown and described.

3. The combination, in a velocipede and with the steering-wheel q, its shaft-arm r, and rod s, of the slotted yoke t, provided on its under side with a rack, w, and the steering-shaft u, secured to the frame, and provided with a collar at its lower squared end, above the yoke, and with a pinion, v, below the yoke, whereby the yoke is operated and supported by the collar and pinion, substantially as set forth.

4. The combination, with the steering-wheel q, its shaft-arm r, rod s, yoke t w, pinion v, and handle-shaft $u\ u'$, arranged to be operated from the driver's seat m, of the rod x and duplicate gear $t\ w\ v\ u\ u^2$, located for operation by the passenger from his seat d, whereby the velocipede may be guided either by the driver or passenger, substantially as shown and described.

5. The combination, in a velocipede, of a frame, $a\ a'\ b$, axle c, passenger-seat d, main wheels g, steering-wheel q, leading-wheel y, chain-wheels and gearing h i j, treadles l, driver's seat m, and the steering-gear $r\ s\ t\ w\ v\ u\ u'\ u^2$, arranged at either or both of the seats d m, to be operated therefrom, and said seats d m being relatively positioned to have the driver's weight overbalance the passenger, the whole being constructed and arranged to operate substantially as shown and described.

The foregoing specification of my improvements in velocipedes signed by me this 4th day of December, 1883.

GEORGE LOUIS OUTRAM DAVIDSON.

Witnesses:
JAMES HODGKINSON,
EDMUND CHADWICK.